United States Patent

[11] 3,543,738

| [72] | Inventors | Robert O. Barber<br>Corning;<br>William C. Anderson, Savona, New York |
|---|---|---|
| [21] | Appl. No. | 797,551 |
| [22] | Filed | Feb. 7, 1969 |
| [45] | Patented | Dec. 1, 1970 |
| [73] | Assignee | Ingersoll-Rand Company<br>New York, New York<br>a corporation of New Jersey |

[54] SPARK IGNITION CONTROL SYSTEM
8 Claims, 2 Drawing Figs.

[52] U.S. Cl. ................................................. 123/117,
123/149
[51] Int. Cl. .............................................. F02p 5/12,
F02p 5/04, F02p 5/14

[50] Field of Search ............................................ 123/149,
149(C), 149(F1), 117, 117.1

[56] References Cited
UNITED STATES PATENTS
3,057,938  10/1962  Perry ........................... 123/149

*Primary Examiner*—Wendell E. Burns
*Attorneys*—Carl R. Horten and David W. Tibbott ABSTRACT: Control system for a spark ignited gas engine in which the pressures in the air manifold and fuel manifold, and the speed of the engine, are measured and compared, and a resultant signal is produced to actuate a magneto to set the spark timing in accordance with the air gas fuel ratio, and the load of the engine. The control system also measures the temperature in the air manifold and produces a signal when that temperature exceeds a predetermined value to adjust the spark in order to prevent detonation.

Patented Dec. 1, 1970 3,543,738

SPARK IGNITION CONTROL SYSTEM

The present invention is related to spark ignited internal combustion engines of the type supercharged by a turbine actuated by the engine exhaust. More in particular, the invention is related to a control system for the spark ignition timing for such an engine.

In commonly known spark ignited gas engines, various controls are used to achieve that a proper volume and composition of fuel gas air mixture be supplied to the engine, and that the ignition of such mixture be properly time for an efficient combustion and expansion process during the power stroke of the engine. These controls measure various operational conditions, such as air manifold temperature, fuel gas manifold pressure, and the speed of the engine shaft, and by means of signals, a final control mechanism or totalizer is actuated to vary the spark timing in accordance with the output signals received from the controls.

However, due to inherent mechanical deficiencies of prior art controls and engine components, as well as the lack of taking all critical factors into consideration for an optimum engine efficiency and economy, various difficulties are encountered in producing the proper spark timing for maintaining maximum engine efficiency and economy over the entire rated load of the engine at any rated engine speed or torque.

In the operation of engines of this type, it is of utmost importance to control the timing of the spark ignition in accordance with those critical factors essential to maintain maximum efficiency and economy over the entire rated load range of the engine and at any speed and torque within the related range of the engine. These critical factors include engine speed, fuel gas manifold gas fuel air ratio, and temperature of the air in the air intake manifold.

In order to achieve maximum efficiency and economy of operation, spark ignition of the charge, mixture of fuel gas and air, in the combustion chamber of the engine is to occur several degrees before top dead center on the compression stroke of the engine so that, due to the interval of time between ignition and pressure buildup, the peak pressure for the power stroke of the engine will occur just after the piston reaches top dead center.

Although this time interval is dependent upon several factors, the factor of fuel gas air ratio in particular is of prime importance since this mainly determines the peak pressure in the combustion chamber of the engine while timing the combustion of this fuel gas air mixture determines not only the amount of energy for the power stroke of the engine, but also the amount of energy released from the combustion chamber for the operation of the turbo charger producing the air for the fuel gas air mixture for the power stroke of the engine.

Accordingly, one object of the invention is to provide a novel control system for automatically varying the timing of ignition for such an engine which is reliable in operation.

Another object of the invention is to provide a novel control system for maintaining the maximum efficiency and economy in such an engine over the entire rated torque and speed range thereof.

Another object of the invention is to provide a novel control system to prevent detonation in such an engine.

Still another object of the invention is to provide a novel control system which is economical and relatively simple.

These and other objects are achieved by the provision of a novel control system for a spark ignited gas engine having a fuel gas manifold, an air manifold, and ignition means adapted to adjustably produce a spark, and including a servomotor to actuate the ignition means, and a speed transmitter adapted to produce a speed signal in response to the speed of the engine. Further included is a comparator means connected to the fuel gas manifold and adapted to produce a signal in response to the pressure in the fuel gas manifold, and connected to the speed transmitter to receive the speed signal, and also connected to the air manifold and adapted to produce a signal in response to the pressure in the air manifold, and further adapted to compare said signals and produce a resultant signal. The comparator means is connected to the servomotor to transfer said resultant signal to the servomotor to actuate the ignition means to set the spark for the engine in accordance with the engine speed, fuel gas manifold pressure, and air manifold pressure. Furthermore, a temperature transmitter is provided to measure the temperature in the air manifold and produce a signal when that temperature exceeds a predetermined value, the temperature transmitter being connected to the comparator means to modify the resultant signal to the servomotor when the temperature in the air manifold exceeds said predetermined value.

The foregoing and other objects and advantages of the invention will appear more fully from the following description and accompanying drawings which illustrate a preferred embodiment of the invention. The drawings, however, are for purposes of illustration only and are not to be taken as limiting the invention since it will be understood that various changes may be made without departing from the scope of the invention as defined by the appended claims.

Figures 1, 2:
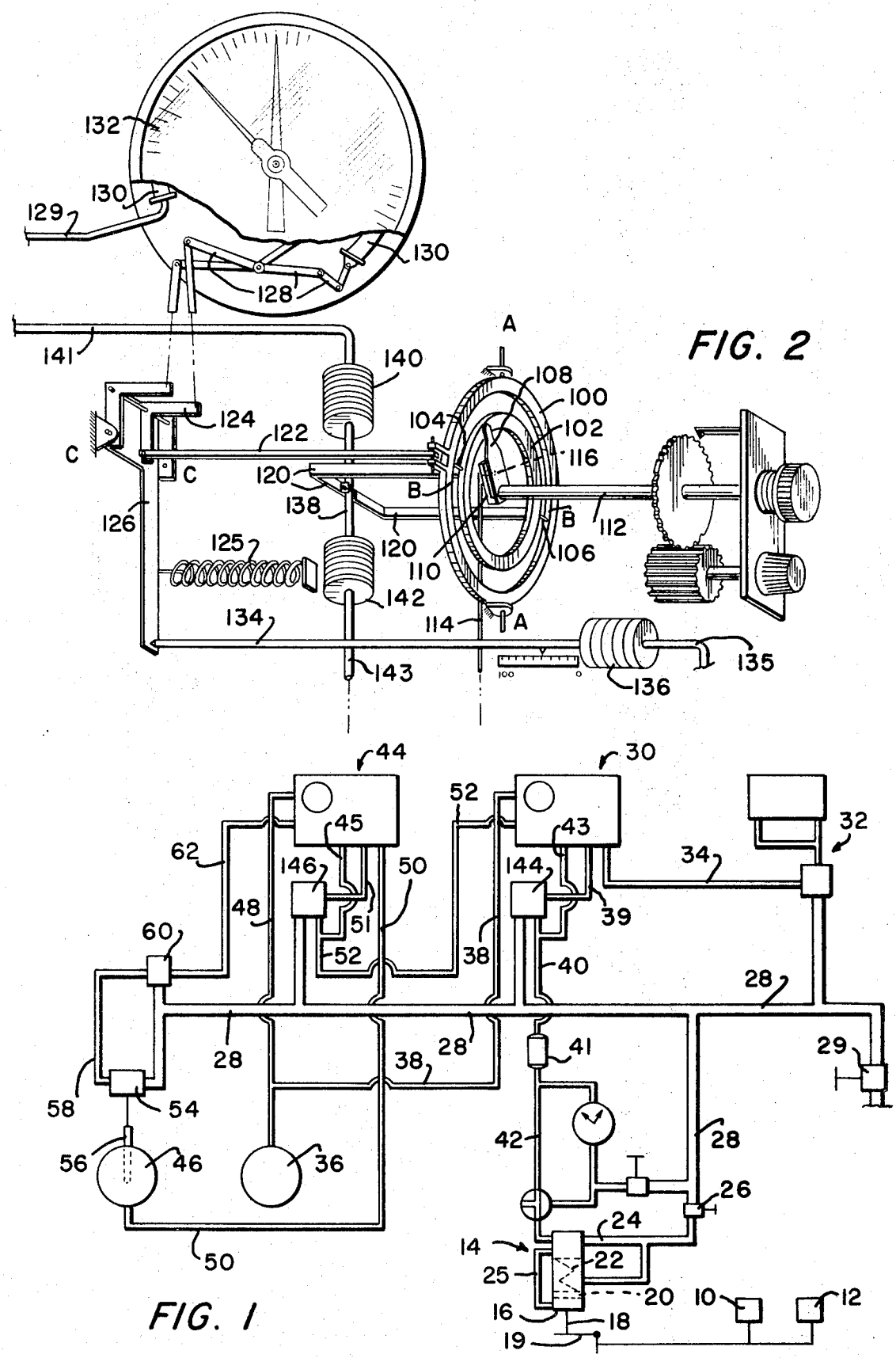
FIG. 1 shows a schematic drawing of the novel control system.
FIG. 2 shows a schematic drawing of one of the comparator means included in the novel control system.

Referring to the drawings, the novel control system shown schematically in FIG. 1 includes ignition means, which may be in the form of a pair of magnetos 10 and 12 of a magneto ignition system for producing a spark for the ignition. The magneto ignition system, of a commonly known type, is adapted to advance and retard such spark for timing of the ignition and is connected to a servomotor 14 which may be of any well known construction. In this instance, the servomotor 14 includes a cylinder 16 into which a piston rod 18 extends for connection with a piston 20. Piston 20 is biased in one direction by a spring 22, and normally balanced by pressure fluid supplied through conduits 24 and 25 to the opposite sides of piston 20, the pressure in conduits 24 and 25 being controlled by a pressure regulator 26 receiving pressure fluid from a constant pressure supply line 28 which in turn is supplied with such pressure fluid of constant pressure by means of a commonly known pressure reducing valve 29 connected to a source of high pressure fluid, not shown. A signal in the form of pressure fluid is conducted to cylinder 16 by means of conduit 42 to unbalance and actuate piston 20 and piston rod 18 which in turn actuates lever 19 connected to the ignition means, or the breakers (not shown) of the magneto ignition system to advance or retard the spark. The aforementioned signal is produced by a comparator means which will be hereinafter explained in detail.

Although the various components of the novel control system are shown to be pneumatically operated, it is pointed out that any other well known means of receiving, transmitting or converting signals or measurements electrically, hydraulically or pneumatically, or a combination thereof, may be used to arrive at the final adjustment of the ignition means or magnetos for the proper spark timing.

The novel control system includes, in addition to the hereinbefore described ignition means or magneto ignition system, a commonly known comparator 30, as will be explained hereinafter in detail, connected to a commonly employed speed transmitter 32 by means of a conduit 34 through which a pneumatic signal is conducted, this pneumatic signal being converted in a commonly known manner from the engine speed measured by a tachometer, not shown. Comparator 30 is also connected to the fuel gas manifold 36 by means of conduit 38 through which the pressure in the fuel gas manifold is conducted. By means of links and levers, as will be explained hereinafter in detail, the two signals, one signal representing the engine speed, and one signal representing the fuel gas manifold pressure, are compared in comparator 30 to produce a resultant signal which is then conducted through circuit 39 into a commonly employed amplifier 144 in which the signal is amplified and conducted through conduits 40 and 42 to servomotor 14. Servomotor 14 is thus actuated in accordance with the signal received from comparator 30, and in turn actuates the magneto ignition system to adjust the spark timing. Since the engine torque or "load" of the engine is directly proportional to the fuel gas manifold pressure, the fuel gas manifold pressure being controlled by the engine governor, not shown, which regulates the supply of fuel gas to the fuel gas manifold in accordance with the load demand on the engine, this signal serves as a load indicator.

Since comparator 30 produces relatively low volume pneumatic output signals, it is necessary to amplify such signals in order to cause the servomotor 14 to act promptly upon receiving the output signals from comparator 30. Accordingly, amplification of the output signals produced by comparator 30 is achieved in a commonly employed relay or amplifier 144 connected to constant pressure, pressure fluid supply line 28. The relatively low volume pneumatic signal is conducted through conduit 114 of comparator 30 and conduit 39 into amplifier 144 in which the signal is converted to a relatively high volume pneumatic signal and conducted through conduits 40 and 42 to servomotor 14 of the magneto ignition system.

As the air fuel gas ratio is affected by various transit conditions such as slow starting of the turbo charger due to cold lubricant, turbo charger deterioration, faulty control of the preheater in the turbo charger system, or faulty spark plugs, the turbo charger could cause, for instance, a drop in the air manifold pressure which in turn produces a "rich" mixture, low air fuel gas ratio, causing fast burning of such "rich" mixture of air and fuel gas. This fast burning of the "rich" mixture requires a decrease in the spark advance in order to achieve the peak pressure for the power stroke of the engine just after the piston reaches top dead center. In decreasing the spark advance, the energy available in the exhaust of the engine for the turbo charger is increased, and consequently, the speed of the turbo charger is increased and, hence, the air manifold pressure is increased so the proper air fuel gas ratio is achieved.

In order to meet the aforementioned conditions, the air fuel gas ratio is measured and converted in another commonly known employed comparator 44, identical in structure to comparator 30, into which the pressures in the fuel gas manifold 36 and air manifold 46 are conducted by means of conduits 48, 50, respectively, so that in comparator 44 the air fuel gas ratio is compared to the desired air fuel gas ratio to produce a resultant signal which is then conducted by means of amplifier 146, identical in structure to amplifier 144, and conduit 52 to comparator 30. This resultant signal is compared in comparator 30 with the resultant signal previously arrived at from the signals received from the speed transmitter 32 and fuel gas manifold 36, and a final signal is produced and conducted to servomotor 14 for the proper spark timing.

The two aforementioned commonly known comparators 30 and 44 form a part of the novel control system and since both comparators are of identical design, only one comparator will be explained, namely, comparator 30. However, as both comparators are of identical design, the following description of comparator 30 is equally applicable to comparator 44.

As shown in FIG. 2, comparator 30 comprises two concentrically positioned rings, an outer ring 100 and an inner ring 102. Outer ring 100 is pivotal about a vertical axis A-A while inner ring 102 is connected by pins 104 and 106 to outer ring 100 to be pivotable about a horizontal axis B-B. With this arrangement, movement of outer ring 100 about its vertical axis causes simultaneous movement of inner ring 102 about its vertical axis, while inner ring 102 is movable about its horizontal axis B-B relative to outer ring 100 without causing any movement of outer ring 100.

A flexible baffle 108 is mounted on a rigid nozzle holder 110, and as a unit connected to a shaft 112 in such a manner that the upper end portion of baffle 108 is held in constant engagement with inner ring 102. Nozzle holder 110 is shorter in length than flexible baffle 108 while its upper end portion is spaced from baffle 108.

The upper end portion of nozzle holder 110 is provided with an opening through which a conduit 114 extends, conduit 114 being rigidly held with its open end in the form of a nozzle 116 spaced from baffle 108. With this arrangement, movement of inner ring 102 about its horizontal axis B-B causes baffle 108 to move away from or toward nozzle 116, the purpose of which will be explained hereinafter.

Movement of inner and outer rings 102, 100, respectively, is achieved by arms 120 rigidly connected to inner ring 102, and rod 122 having one end pivotally connected to outer ring 100 while its other end is pivotally connected to the outer end of one of the legs of a lever 124, lever 124 being pivotally connected to the outer end of one of the legs of another lever 126 which in turn is pivotable about a horizontal axis C-C. The other leg of lever 124 is connected to a linkage 128 actuated by the free end of a bourdon tube 130, partly shown, of a pressure gauge 132, bourdon tube 130 being actuated by a pressure signal conducted thereto through conduit 129. The other leg of lever 126 extends downwards and is in engagement with a rod 134 actuated by the pressure in a bellows 136 receiving a pressure signal from a conduit 135. The lower leg of lever 126 is constantly held in engagement with rod 134 by a spring 125.

Actuation of inner ring 102 about its horizontal axis B-B is achieved by a rod 138 connected to one of the arms 120, rod 138 being actuated by the pressure differential between the pressures in bellows 140 and 142, both bellows being in communication with conduits 141 and 143, respectively, as will be explained hereinafter in detail.

In the event that the torque or load demand on the engine is increased, the governor of the engine, not shown, automatically sensing the drop in engine speed, causes the pressure of the fuel gas in the fuel gas manifold 36 to increase. This pressure increase is conducted through conduit 38 into conduit 129 connected to the bourdon tube 130 of pressure gauge 132 of comparator 30, and causes the free end of the bourdon tube 130 to move to the right effecting links 128 and lever 124 to move rod 122 to the left which movement in turn causes the outer and inner rings 100 and 102 to pivot to the left about axis A-A thereby decreasing the distance between baffle 108 and nozzle 116. A decrease of the distance between baffle 108 and nozzle 116 causes an increase in the pressure in conduit 114 and conduit 39 connecting amplifier 144 with conduit 114. Amplifier 144 modifies this relatively low volume pressure signal into a relatively high volume output signal which is then conducted to conduits 40 and 42 causing piston 20 of servomotor 14 to be raised to reduce the spark advance or retard the spark timing of the ignition.

It is to be noted that a container 41 is provided between conduits 40 and 42 to absorb any fluctuations in pressure in conduit 40 in order to prevent these fluctuations from causing piston 20 of servomotor 14 to reciprocate or vibrate.

An increase of the speed of the engine causes an increase in the pressure of the output signal of speed transmitter 32 conducted by means of conduit 34 to conduit 135 within controller 30. Increase of the pressure in conduits 34 and 135 causes rod 134 to move to the left and lever 126 to pivot clockwise about axis C-C. Clockwise rotation of lever 126 about axis C-C causes lever 124 and rod 122 to move to the right whereby outer and inner rings 100 and 102 pivot to the right about axis A-A causing baffle 108 to be moved away from nozzle 116 effecting the pressure of the output signal in conduit 114 to decrease. A decrease of the output signal in conduit 114 of comparator 30 is conducted through conduit 39 into amplifier 144 producing an amplified pneumatic signal which is then conducted through conduits 40 and 42 to servomotor 14 and causes piston 20 of servomotor 14 to be lowered to increase or advance the spark timing of the ignition.

In the event the pressure in the air manifold decreases, possibly because of one of several engine component deficiencies such as a faulty preheater control, the "rich" mixture of fuel gas and air caused by such drop in the pressure in the air manifold burns faster and is to be corrected so that the peak combustion pressure is achieved slightly after the related piston of the engine reaches top dead center. A drop in the pressure in the air manifold is measured and conducted through conduits 50 and 135 to bellows 136 of comparator 44 causing rod 134 to be moved by spring 125 to the right, and lever 126 to move counterclockwise about axis C-C.

Counterclockwise movement of lever 120 about axis C-C causes lever 124 to move rod 122 to the left, and the pivot point between rod 122 and outer ring 100 to move to the left causing inner ring 102 to move baffle 108 towards nozzle 116 thereby increasing the pressure or output signal in conduit 114 of comparator 44. The increased pressure or output signal from conduit 114 is conducted through conduit 51 into amplifier 146, identical in structure to amplifier 144 of comparator 30, in which the output signal from comparator 44 is amplified and conducted through conduit 52 to conduit 141 in comparator 30. The increased output signal is then conducted into bellows 140, and due to the feedback of less pressure in bellows 142 and conduit 143 connected to conduits 43 and 42 relative to the pressure in conduit 141, rod 138 is caused to move downwards actuating arms 120 to move inner ring 102 counterclockwise about axis B-B. Counterclockwise movement of inner ring 102 causes baffle 108 to move towards nozzle 116 increasing the pressure in conduits 114, 39, 40 and 42 so that piston 20 of servomotor 14 is moved upwards, and by means of link 19, the spark is retarded. By retarding the ignition timing, the energy released from the combustion chamber is increased, thus increasing the speed of the turbo charger, not shown, and as a consequence thereof, the pressure in the air manifold is increased and a proper air gas fuel ratio is achieved.

While comparators 30 and 44 provide for the spark timing in accordance with the engine speed, fuel gas manifold pressure, and fuel gas air ratio, the novel control system includes means to prevent detonation. Since "detonation" of the charge, mixture of fuel gas and air, in the combustion chamber is caused mainly by an excessive temperature of the air in the air intake manifold due to unusual operating conditions, the temperature in the air intake manifold is to be constantly measured. However, since it is impractical to provide for an emergency shutdown of the engine unless the temperature in the air manifold reaches a predetermined critical value, and no adjustment of a normal spark timing is required when the air manifold temperature is below said predetermined value, a signal is to be produced only when the temperature in the air manifold rises above said predetermined critical value.

In order to measure the fluctuations in the air manifold 46 temperature, a temperature transmitter 54 of a commonly known type is connected to a temperature sensing bulb 56 in the air manifold 46 and to constant pressure, pressure fluid supply line 28. Temperature transmitter 54 measures and converts the temperatures by means of a commonly known thermal system into pneumatic signals which are conducted by means of conduit 58 to a commonly employed low limit relay or pressure regulator 60 adapted to receive varying pressure signals from temperature transmitter 54, but to produce a minimum pressure of constant value when the temperature in the air manifold is below a predetermined critical value. Pressure regulator 60 is connected to conduit 141 of comparator 44 by means of conduit 62, and as long as the temperature in the air manifold is below said predetermined critical value, the pressure in conduit 62 is maintained at said constant minimum value. However, as soon as the temperature in the air manifold rises above said predetermined critical value, pressure regulator 60 produces an increase in the pressure in conduits 62 and 141, and bellows 140, and due to the feedback of less pressure in conduit 143 relative to the pressure in conduit 141, rod 138 is caused to move downwards actuating arms 120 to move inner ring 102 counterclockwise about axis B-B. Counterclockwise movement of inner ring 102 causes baffle 108 to move towards nozzle 116 increasing the pressure in conduit 114. This output signal from comparator 44 is then conducted by means of amplifier 146 and conduit 52 to comparator 30 wherein this signal produces the same effects produced in comparator 44 and consequently an increased output signal in conduit 39, amplifier 144, conduits 40 and 42 causing piston 20 of servomotor 14 to be moved upwards to retard the spark.

Although only one embodiment of the invention has been illustrated and described, it will be apparent to those skilled in the art that changes and modifications may be made in the form and general arrangement of the components without departing from the scope of the invention.

We claim:

1. A control system for a spark ignited gas engine having a fuel gas manifold and an air manifold, and ignition means adapted to be variably timed, comprising:
   a servomotor to vary the timing of said ignition means;
   a speed transmitter adapted to produce a speed signal variable with the speed of the engine; and
   comparator means connected to said fuel gas manifold and to said air manifold adapted to produce signals variable with the pressures in said manifolds, and connected to said speed transmitter to receive said speed signal, and adapted to compare said signals and produce a resultant signal, and said comparator means being connected to said servomotor to transmit said resultant signal to said servomotor to actuate said ignition means to set the spark for said engine in accordance with the engine speed, fuel gas manifold pressure, and air manifold pressure.

2. The control system in accordance with claim 1 in which said comparator means comprises a first comparator connected to said speed transmitter and said fuel gas manifold to receive said speed signal and said signal from said fuel gas manifold and adapted to compare said signals and produce a resultant signal, a second comparator connected to said fuel gas manifold and to said air manifold to receive said signal from said fuel gas manifold and said signal from said air manifold and adapted to compare said signals and produce a resultant signal, said comparators being connected to each other to compare said resultant signals and to produce a final signal in one of said comparators, said one of said comparators being connected to said servomotor to transmit said final signal to said servomotor.

3. A control system for a spark ignited gas engine having an air manifold and a fuel manifold and ignition means, comprising:
   a pressure fluid actuated servomotor to actuate said ignition means to set the spark for said engine;
   a source of constant fluid pressure;
   a speed transmitter connected to said source of constant fluid pressure adapted to produce a fluid pressure signal in response to the speed of said engine and proportionate to said constant fluid pressure;
   comparator means connected to said source of constant fluid pressure, and connected to said air manifold adapted to produce a fluid pressure signal in response to the pressure in said air manifold and proportionate to said constant fluid pressure, and connected to said fuel manifold adapted to produce a fluid pressure signal in response to the pressure in said fuel manifold and proportionate to said constant fluid pressure, and connected to said speed transmitter to receive said fluid pressure signal representing said speed of said engine; and
   said comparator means being adapted to compare said fluid pressure signals and produce a resultant fluid pressure signal, and connected to said servomotor to transmit said resultant fluid pressure signal to said servomotor to actuate said ignition means to set the spark in accordance with the engine speed, fuel manifold pressure and air manifold pressure.

4. A control system for a spark ignited gas engine having an air manifold and a gas manifold, and ignition means adapted to adjustably produce a spark, comprising:
   a servomotor to actuate said ignition means;
   a speed transmitter adapted to produce a signal variable with the engine speed;

a first comparator connected to said air manifold adapted to produce a first signal variable with the pressure in said air manifold, and connected to said fuel manifold adapted to produce a second signal variable with the pressure in said fuel manifold, and adapted to compare said signals and produce a first resultant signal;

a second comparator connected to said fuel manifold adapted to produce a third signal variable with the pressure in said fuel manifold, and connected to said speed transmitter to receive a fourth signal variable with the engine speed, and adapted to compare said third and fourth signals and produce a second resultant signal; and said comparators being connected to each other adapted to compare and produce a final signal; and one of said comparators being connected to said servomotor to transmit said final signal to said servomotor to actuate said ignition means to set the spark in accordance with the engine speed, fuel manifold pressure and air manifold pressure.

5. The control system in accordance with claim 4 in which said second comparator is connected to said servomotor to transmit said final signal thereto.

6. A control system for a spark ignited gas engine having a fuel manifold and an air manifold, and ignition means adapted to adjustably produce a spark, comprising:

a servomotor to actuate said ignition means;

a speed transmitter adapted to produce a signal variable with the speed of the engine;

a temperature transmitter connected to said air manifold adapted to produce a signal variable with the temperature in said air manifold; and comparator means connected to said air manifold and said fuel manifold adapted to measure the pressures in said air manifold and said fuel manifold and produce signals variable with said pressures in said manifolds, and connected to said speed transmitter and to said temperature transmitter to receive the signals therefrom, and adapted to compare said signals and produce a resultant signal, said comparator means connected to said servomotor to transmit said resultant signal to said servomotor to actuate said ignition means to set the spark in accordance with said engine speed, gas manifold pressure, air manifold pressure and air manifold temperature.

7. A control system for a spark ignited gas engine having a fuel manifold and an air manifold, and ignition means adapted to adjustably produce a spark, comprising:

a servomotor to actuate said ignition means;

a speed transmitter adapted to produce a speed signal variable with the speed of the engine;

a temperature transmitter connected to said air manifold adapted to produce a signal variable with the temperature in said air manifold;

a first comparator connected to said temperature transmitter to receive said temperature signal therefrom, and connected to said air manifold and said fuel manifold adapted to measure the pressures in said manifolds separately and produce a single signal resultant from said pressure measurements, and produce a first final signal resultant from said temperature signal and said single signal;

a second comparator connected to said speed transmitter to receive said speed signal therefrom, and connected to said fuel manifold to measure the pressure in said fuel manifold and produce a signal in response therewith; and producing a signal resultant from said speed signal and said fuel manifold pressure signal, and connected to said first comparator to receive said first final signal and adapted to produce a second final signal resultant from said first final signal and said signal resultant from said speed signal and said fuel manifold pressure signal, and connected to said servomotor to transmit said second final signal thereto to effect actuation of said ignition means to set the spark in accordance with the fuel air ratio and load of the engine and temperature of the air in said air manifold.

8. The control system in accordance with claim 7 in which said signal produced by said temperature transmitter is of constant value when said temperature in said air manifold is below a predetermined value, and said first comparator being adapted to modify said first final signal only when said temperature in said air manifold exceeds said predetermined value.